United States Patent
Mizes et al.

(10) Patent No.: US 6,819,352 B2
(45) Date of Patent: Nov. 16, 2004

(54) METHOD OF ADJUSTING PRINT UNIFORMITY

(75) Inventors: Howard A. Mizes, Pittsford, NY (US); Daniel E. Viassolo, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 20 days.

(21) Appl. No.: 10/342,543

(22) Filed: Jan. 15, 2003

(65) Prior Publication Data

US 2004/0135878 A1 Jul. 15, 2004

(51) Int. Cl.[7] .................................................. B41J 2/47
(52) U.S. Cl. ...................................... 347/240; 347/251
(58) Field of Search ................................ 347/236, 237, 347/240, 246, 247, 251, 238, 253; 358/1.9

(56) References Cited

U.S. PATENT DOCUMENTS

| 5,546,165 | A | | 8/1996 | Rushing et al. ............... 399/78 |
| 5,666,150 | A | | 9/1997 | Ajewole ...................... 347/240 |
| 5,668,587 | A | | 9/1997 | Hammond et al. .......... 347/237 |
| 5,859,658 | A | | 1/1999 | Hammond .................. 347/238 |
| 6,424,432 | B1 | * | 7/2002 | Koide et al. ................ 358/1.9 |
| 6,452,696 | B1 | * | 9/2002 | Bogart et al. ............... 358/1.9 |

* cited by examiner

Primary Examiner—Hai Pham
(74) Attorney, Agent, or Firm—Fay, Sharpe, Fagan, Minnich & McKee, LLP

(57) ABSTRACT

A method of adjusting print uniformity in a xerographic device is provided. The method includes: a) printing a test pattern, b) transferring the printed test pattern to a scanner, c) scanning the printed test pattern and detecting line information, d) communicating the detected information to a computer, e) determining measurements from the detected line information, f) calculating the difference between the measurements and target values, and g) depending on the difference, adjusting a current supplied to an individual LED of an LED printbar associated with the measurement to reduce the difference. In one aspect, a test pattern line is associated with an individual LED. In another aspect, test pattern lines are associated with two adjacent LEDs and three adjacent LEDs. In yet another aspect, the test pattern includes dotted lines. In still another aspect, the invention includes a xerographic device with an LED printbar, a computer, and a scanner device.

46 Claims, 11 Drawing Sheets

METHOD OF ADJUSTING PRINT UNIFORMITY

BACKGROUND OF INVENTION

The invention relates to a method of adjusting print uniformity in a xerographic device. It finds particular application in conjunction with adjusting print uniformity by adjusting individual light emitting diode (LEDs) in an LED printbar of a xerographic device and will be described with particular reference thereto. However, it is to be appreciated that the invention is also amenable to other applications.

Full width array imagers that are used in image recording systems are well known in the art. Such imagers are generally comprised of a linear array of discrete sources. The sources may emit ink, ions, or light. Examples of full width array imagers include wire dot, electrostatic, ink jet, and thermal print heads. Light emitting diode (LED) full width array imagers are commonly used because of their high resolution and fast response time. They consist of an arrangement of a large number of closely spaced LEDs in a linear array. By providing relative motion between the LED printbar and a photoreceptor, and by selectively energizing the LEDs at the proper times, a desired latent electrostatic image can be produced on the recording member. The production of a desired latent image is usually performed by having each LED expose a corresponding pixel on the recording member in accordance with image-defining video data information applied to the printbar through driver circuitry. Conventionally, digital data signals from a data source, which may be a Raster Input Scanner (RIS), a computer, a word processor or some other source of digitized image data is clocked into a shift register. Some time after the start of a line signal, individual LED drive circuits are then selectively energized to control the on/off timing of currents flowing through the LEDs. The LEDs selectively turn on and off at fixed intervals to form a line exposure pattern on the surface of the photoreceptor. A complete image is formed by successive line exposures.

The light emitted by each element in an LED printbar is controlled by the element's input current. Due to manufacturing variations, actual LED printbars will not show equal light outputs when the input currents for each LED are the same. These variations in light output expose the photoreceptor differently and give undesirable streaks in the prints (in the process or slow-scan direction). Currently, to make the emitted lights uniform across the bar, the light from each element is measured with a single photodiode that is moved along the bar; and the input currents to individual elements are adjusted until the emitted lights are equalized. There are two important drawbacks associated to this technique. First, the adjustment cannot be done with the LED printbar mounted in the printer; and thus the procedure takes a lot of time. Second, the uniformity of the emitted light does not guarantee the uniformity of the print on a target media since this uniformity depends also on metrics of the beam shape and xerographic effects. A narrow beam and a broad beam with the same total power will give rise to spots or lines of different width. Line scan cameras can map the beam shape. Still, the effect xerography will have on different beams depends on the xerographic setpoints and the state of the material cannot be predicted with certainty.

Furthermore, the LEDs may have different aging characteristics that will change the pixel-to-pixel non-uniformity. To a first approximation, a decrease in an individual LED's light output is a simple function of the LED's accumulated "on" time. This "on" time will vary for each individual pixel based on the history of images printed by the printer. A prior art solution to the aging problem is to periodically measure the light output as each pixel is individually turned on. When degradation is detected, the outputs for the degraded LEDs are adjusted. However, again this technique does not give streak free prints for the same reasons described above.

Additionally, U.S. Pat. No. 5,668,587 discloses a technique for adjustment of LED current for LEDs in a printbar based on accumulated counts representative of LED "on" time. The technique achieves uniformity in light output of the LED printbar in a manner that senses the operational "on" time of each LED. When the "one" time difference between the LED with the longest "on" time and the LED with the shortest "on" time exceeds a predetermined value, the outputs of at least some LEDs comprising the printbar are compensated to normalize their light output. This normalization is achieved via a drive circuit that drives each LED based upon correction data, and by determining an update of the correction data based upon the difference between the "on" time of individual LEDs. The correction data is determined when the difference between the "on" time of the LED with the longest "on" time and the "on" time of the LED with the shortest "on" time exceeds a predetermined maximum difference.

Furthermore, U.S. Pat. No. 5,859,658 discloses a technique for adjustment of LED current for LEDs in a printbar based on changes in the I–V characteristics of the LED. The technique is accomplished using an apparatus for compensating LED printbars, and printers that use LED printbars, for aging. Changes in the slopes of the forward voltage drop verses forward current characteristics (the I–V characteristics) of the LEDs of the LED printbar are determined. The drive currents of the LEDs are then changed as a function of the changes in the slopes so as to compensate for changes in the LED light outputs.

BRIEF SUMMARY OF INVENTION

Thus, there is a particular need for a method of adjusting print uniformity by adjusting individual LEDs in an LED printbar of a xerographic device. The invention contemplates several methods of adjusting print uniformity that overcome at least one of the above-mentioned problems and others.

In one aspect of the invention, a method of adjusting print uniformity for a xerographic device having an LED printbar is provided. The method includes: a) printing a test pattern line on a target media in the process direction of the xerographic device, wherein the test pattern line is associated with an individual LED of the LED printbar; b) transferring the target media with the printed test pattern line to a scanner, c) scanning the target media and detecting the printed test pattern line; d) communicating detected test pattern line information to a computer; e) determining a measured metric from the detected test pattern line information; f) calculating the difference between the measured metric and a target value; and g) if the absolute value of the difference exceeds a first predetermined threshold, adjusting the current supplied to the individual LED associated with the test pattern line to reduce the difference. In another embodiment, the steps (a) to (g) may be iterated two or more times until the absolute value of the difference is below a predetermined threshold.

In another aspect of the invention, another method of adjusting print uniformity for a xerographic device having an LED printbar is provided. This method works for high resolution LED imagers, where process direction lines printed with a single LED illuminated are too narrow to print out. The method consists of grouping the LED's by threes, and printing out different combinations of each group. Specifically, the method includes: a) printing a first test pattern line, a second test pattern line, and a third test pattern line on a target media, wherein each test pattern line is in the process direction of the xerographic device, wherein the first test pattern line is associated with a first LED of the LED printbar and an adjacent second LED, wherein the second test pattern line is associated with the second LED and an adjacent third LED, wherein the third test pattern line is associated with the first, second, and third LEDs, and wherein each test pattern line is spaced from adjacent test pattern lines; b) transferring the target media with the printed first, second, and third test pattern lines to a scanner; c) scanning the target media and detecting the printed first, second, and third test pattern lines; d) communicating detected first test pattern line information, detected second test pattern line information, and detected third test pattern line information to a computer associated with control of current supplied to individual LEDs of the LED printbar; e) determining a first measured metric from the detected first test pattern line information, a second measured metric from the detected second test pattern line information, and a third measured metric from the detected third test pattern line information; f) calculating the difference between the first measured metric and a first target value; g) calculating the difference between the second measured metric and the first target value; h) calculating the difference between the third measured metric and a second target value; and i) if the absolute value of the difference in one or more of steps f) through h) exceeds a predetermined threshold, isolating the difference to one of the first, second, or third LEDs and adjusting the current supplied to the isolated LED to reduce the difference.

In yet another aspect of the invention, a xerographic device is provided. The xerographic device including an LED printbar having a plurality of individual LEDs, a computer, and a scanner device.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

Figure 1:
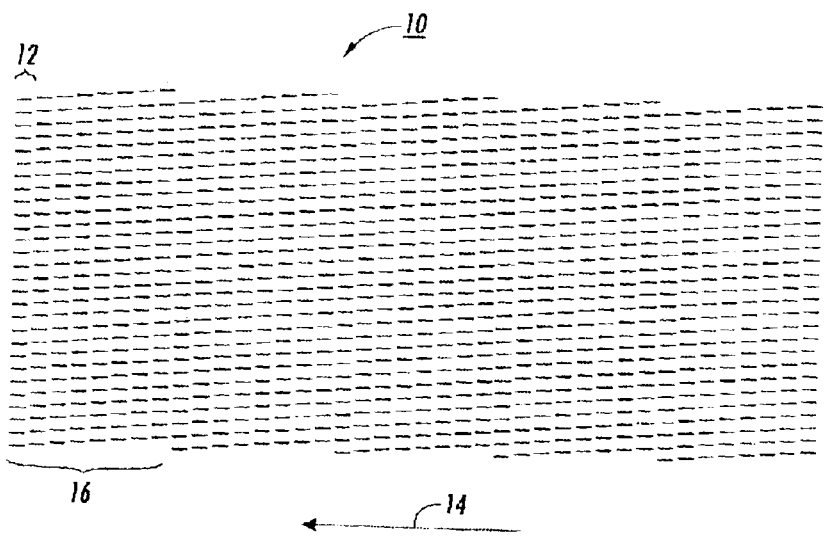
FIG. 1 is an example of a printed test pattern used in an embodiment of the invention.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. Within the drawings, like reference numerals denote like elements.

In one embodiment of the invention, the final print is used as a mechanism to monitor and adjust print uniformity by adjusting the current of individual LEDs in the LED printbar. Streaking caused by the xerographic subsystems can remain unknown. In addition to compensating for the inherent nonuniformity of individual LEDs, individual LED intensities are adjusted to compensate for the effects of streaking caused by the other xerographic subsystems by adjusting individual LED current.

Instead of measuring the nonuniformity of the light output directly, the effect of the nonuniformity on the print is detected and measured. A test pattern consisting of a pattern of lines is printed, where each line is formed from turning on a single LED element. FIG. 1 shows an example of a test pattern 10 printed on a target media. An image analysis algorithm, straightforward to those skilled in the art, is employed to identify the positions of each line on the target media. The scanner response at the position of each line provides of an array of reflectance measurements that are relatively low in value when the sensor detects an imaged portion of line and relatively high in value when the sensor detects an imaged portion of the target media. From this array of reflectance measurements a variety of metrics can be extracted. One metric is the sum of the differences between the reflectance measurements associated with the line and the average reflectance of the target media (i.e., summed line reflectance metric).

Figure 18:
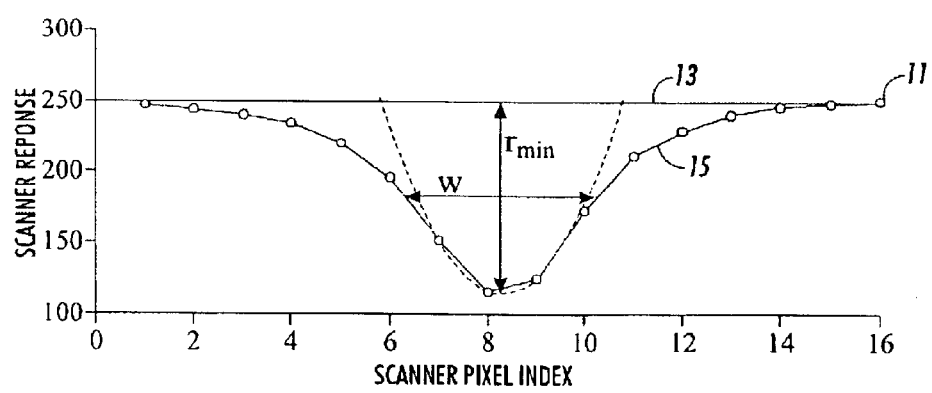
FIG. 18 shows an example of a set of cross section measurements in the vicinity of a line of printed test pattern line.

The scanner response in the vicinity of each line can be averaged over all pixels running parallel to the line to obtain one or more cross section measurements associated with the line. FIG. 18 shows an example of one set of cross section measurements 11 in the vicinity of a line. From these cross section measurements, other metrics related to the LED intensity can be extracted. One cross section metric, for example, is the integral of the one or more cross section measurements (i.e., integrated line reflectance metric). In FIG. 18, for example, line 13 represents the average reflectance of the target media and line 15 represents a curve fitted to the reflectance measurements for the cross section. The area between lines 13 and 15 represents the integrated line reflectance metric for this cross section.

Another cross section metric is the minimum value for the reflectance measurements over the one or more cross sections (i.e., minimum line reflectance metric). In FIG. 18, for example, $r_{min}$, represents the minimum reflectance metric for this cross section. Still another cross section metric is obtained by defining a threshold reflectance value that is compared to the profile of the one or more cross section reflection measurements (i.e., line width metric). In FIG. 18, for example, w represents the line width metric for this cross section. The spacing between the two intersections of line 15 with a user specified threshold is defined as the line width. The choice of the threshold reflectance value is typically chosen to be a value that provides sufficiently high sensitivity to the reflectance of the line versus the reflectance of the target media. Each of these metrics are examples and are not meant to exclude other metrics that one skilled in the art can recognize from an image analysis of the printed test pattern 10.

In one embodiment of the invention, the width of each line in the test pattern is measured on a flatbed scanner. The current of the individual elements of the LED printbar are adjusted when the difference between the measured line width and the desired line width exceeds a predetermined threshold. Control methodologies are used to increase the accuracy of the procedure. Initially, and as the LED printbar ages, the adjustment can be made in situ to maintain high uniformity. Also, adjustments can be made as the printer ages to compensate for other xerographic subsystem failures that result in streaks in printing.

Nonuniform LED printbars lead to streaking in halftone images. Therefore, the goal of the uniformity adjustment is to make halftone patterns uniform. However, the reflectance of a halftone depends on the size of the halftone dots and the reflectance of the target media between the dots. Each dot can be written with more than one LED, so it is not straightforward to relate the local reflectance to the light output of an individual LED.

On the other hand, a single pixel line running in the process direction depends on the light output of only the LED writing that line. The brighter the light, the more the photoreceptor is exposed and the wider the line. The width of each line can be measured, and the LED current adjusted until the width of each line is within a predetermine threshold of an average width or a target width.

The line width measurement is more easily implemented if the single pixel lines can be written in a way that they all fit on a single page. The exemplary test pattern 10 in FIG. 1 includes a series of strips 12. The long direction of the strip 12 is perpendicular to the process direction 14. Each strip consists of a pattern of one line on and n lines off. The number of lines off (n) is large enough so that there is no interaction between the lines. More specifically, the number of lines off (n) is large enough so that, if the width of one line increases due to a brighter LED, the line with increased width has no effect on the width measurement of neighboring lines. Satisfactory results have been obtained with a 1-on-7-off pattern.

Each strip 12 in the test pattern 10 is the same 1-on-n-off pattern, but offset by some number of pixels. In a first strip 12, for example, the on lines correspond to LEDs 1, 9, 17, 25, etc. In the next strip 12, the pattern is offset by, for example, one pixel and lines 2, 10, 18, 26, etc., for example, are turned on. Similarly, the third strip 12 has lines 3, 11, 19, 27, etc., for example, turned on. Additional strips are written in a similar fashion. At some point, after a certain number strips are written (e.g., eight) 16, all the LED intensities can be measured via the single pixel lines in the test pattern 10.

In the test pattern 10, the group of eight lines 16 can be repeated on the single page print to reduce measurement noise. For each LED, a line width measurement is made at different points on the page, which improves the measurement accuracy. For example, in FIG. 1 the eight strips 16 are repeated five times in the test pattern 10. The number of repeats is limited by the length of the line chosen and the number of lines that will fit on a single page.

As discussed in detail below, a control methodology is used to improve the possible line width uniformity beyond the measurement accuracy. As part of the control methodology, the standard deviation of the line width can be used to monitor how adjustments in the system cause the test pattern print to approach uniformity.

Figure 2:
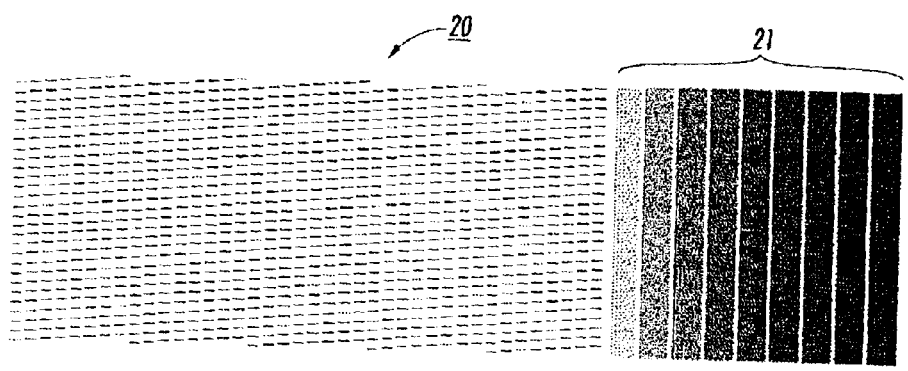
FIG. 2 is another example of a printed test pattern used in another embodiment of the invention.

In another example of a test pattern 20 (FIG. 2), it is useful to include halftone strips 21 so that the uniformity can also be qualitatively observed. In this embodiment, the macro-uniformity of the halftone strips 21 can also be monitored and used to determine when the normalization procedure produces halftones that are uniform enough. As shown in FIG. 2, there may be multiple halftone strips 21 representing multiple densities (e.g., 10%–90% in 10% increments).

The flatbed scanner is used for the line width measurement because it can measure the full page in one image. Normally, the line width is calculated by measuring the average reflectance of the cross section through the line. The width is defined by where the profile crosses the 50 percent point between the target media reflectance and the minimum reflectance at the center of the line. Interpolation is used between the gray level response of each pixel to interpolate between pixels. There is some measurement noise in this technique from interpolation errors and alignment of the flatbed scanner pixels with the line.

The accuracy of the scanner measurement may be increased by using a threshold closer to the minimum of the profile line rather than the 50% point to determine line width. Although changing the threshold does not give the true line width, it is more sensitive to changes in the LED output. Therefore, the measurement error decreases and it is more accurate for making the LEDs uniform. The closer the threshold is to the minimum, the more sensitive this metric is, but the limit should be selected so that the paper reflectance between the lines does not exceed the threshold, thus avoiding false positives for lines.

Another way to increase the sensitivity of the measurement is to change the xerographic setpoints in a way that increases the line width sensitivity to exposure. This can be done, for example, by changing the LED duty cycle so that the photoreceptor is not completely exposed and the lines are light. Lighter lines are more sensitive to exposure changes than fully developed lines. The LED printbar can be made uniform for the xerographic setpoints that give lighter lines and then reset for the required line and halftone densities for imaging. This technique works for conditions where LED uniformity is not sensitive to the xerographic setpoints.

Another source of noise in the uniformity procedure is printer banding. Banding is an intensity variation in the process direction, perhaps due to motion quality, perhaps to other factors. However, printer banding will affect the width of all the lines across a strip roughly the same amount. The effect of banding is that each strip of lines might have a different thickness, even for a uniform LED printbar. Repeating the strips as is done in the proposed test pattern gets rid of some of this noise, but it may still be too high. One can note that if the variations in the LED intensities are uncorrelated between strips, the LEDs in one strip should have the same average intensities as LEDs in any other strip. Uniformity for printer banding is therefore improved by taking the average line width for all the strips and adding a constant to each line in the strip. The average line width of each strip is thus equal for all strips.

More specifically, to improve uniformity for printer banding using the test pattern, each strip of the test pattern consists of $N_{LED}/p$ lines, where p is the period of the repeated lines. Let $\sigma_{line}$ be the standard deviation of the line width, due to both measurement noise and variation in the LED output. Then, the standard deviation of the average line width across a strip will be $\sigma_{line}/\text{sqrt}(N_{LED}/p)$, which is a much smaller number because $N_{LED}$ is so large. If the LEDs are already roughly balanced, then the average line width of each of the strips should be the same. Even if the LEDs are not balanced, if p is not a period of the intrinsic light output variation in the imager, then the average line width should still be equal to within $\sigma_{line}/\text{sqrt}(N_{LED}/p)$.

If a larger line width is detected in one strip compared to other strips, this is typically due to printer banding. To eliminate this source of noise, the measured line width of each strip is normalized using the formula:

$$w^0_{ij} = w^m_{ij} - <w_j> + <w> \qquad (1)$$

where, $w^m_{ij}$ is the measured line width of line i in strip j and $<w_j>$ is the average of all measured lines in strip j. $<w>$ is the average of all the strips and $w^0_{ij}$ is the normalized measured line width of line i in strip j.

If the measurement of a line width has a distribution of $\sigma_w$, then measuring $N_{rep}$ repeats of this line will decrease the noise to $\sigma_{line}/\text{sqrt}(N_{LED}/p)$, if the measurements have a normal distribution of noise.

Figure 3:
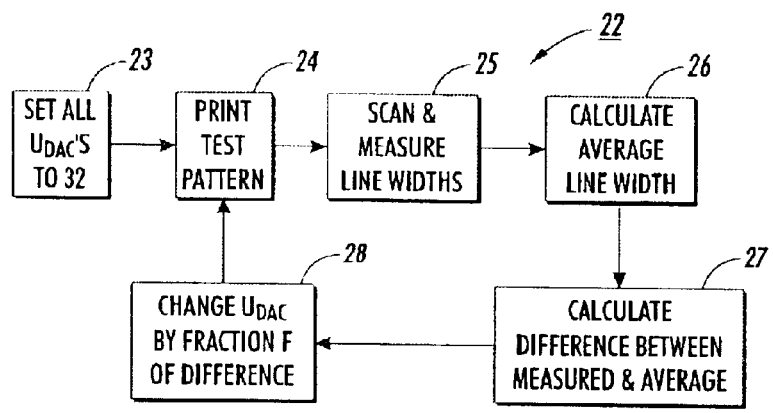
FIG. 3 shows a control methodology for adjusting print uniformity in an embodiment of the invention.

Even after this averaging, further steps may be taken to increase the accuracy of the normalization. A control methodology approach 22, as shown in FIG. 3, is used to increase the accuracy. The individual adjustment of each LED element of the printbar is made by controlling an associated uniformity digital to analog converter, or $U_{DAC}$. For example, a 6-bit $U_{DAC}$ could be used to control individual LED input current. A 6-bit $U_{DAC}$ has 26 or 64 different values representing 64 selectable LED input currents. In FIG. 3, the control methodology 22 begins by setting all the $U_{DACS}$ to 32 (23), a value halfway in between the maximum value (i.e., 63) and the minimum value (i.e., 0), establishing a mid-range LED input current. Then, the test pattern is printed 24. Next, the test pattern is scanned and the width of lines in the test pattern are measured 25. From the line width measurements, the average line width is calculated 26 and treated as a target line width. Next, the difference between each measured line width and the target or average line width is calculated 27. Generally, it is known how to adjust the $U_{DAC}$ for each LED to within a predetermined threshold of the target line width. However, instead of making the full adjustment, the $U_{DAC}$ for each LED is adjusted by a fraction f of the difference between the measured line width and the target line width 28. The fraction f is defined as a partial adjustment with respect to the full adjustment, where 1.0 would represent the fill adjustment. After the partial adjustment is made to each $U_{DAC}$, the test pattern is reprinted 24 and the process is repeated until the absolute value of the difference between the measured line width and the target line width is less than or equal to a predetermined threshold. Because of measurement noise, the full adjustment may not produce an adequate result. Making only a partial adjustment in each iteration allows one to hone in on the proper LED current value. Performing incremental adjustments of the LED current until the measured line width is within a predetermined threshold of the desired line width makes the adjustment process less sensitive to measurement noise and improves the uniformity.

This control methodology can be analytically calculated using control theory. The following results were found using control theory analysis:

$$\sigma_w^{true} = \sqrt{\frac{\frac{f}{2}}{1-\frac{f}{2}}} \; \sigma_w^{measured} \qquad (2)$$

and $$N_{iter} = \frac{\log 0.02}{\log(1-f)}. \qquad (3)$$

In these equations, f is the gain, or the fraction of the adjustment made each iteration. Equation (2) relates the true line width noise (i.e., the line width noise if measurement and printer error could be eliminated) to the measured line width noise as a function off f Note that if f=1 (full adjustment made first iteration), these quantities are equal. Equation (2) shows that the true noise is reduced for smaller values of f. Therefore, a small f can be chosen to decrease the noise level to what is required for the best uniformity. $N_{iter}$ is the number of iterations required to bring the $U_{DAC}$ settings to within 2% of what are required for LED printbar normalization. As expected, as f becomes smaller, equation (3) shows that more iterations are needed.

When this uniformity procedure was reduced to practice, it was found that the resultant uniformity was halftone dependent. Halftones rendered using vertical line screens were extremely uniform, dot screens were less uniform, and coarse screens were more uniform than fine screens.

Through experimentation, it was found that the root cause of this effect for LED imagers was that the LED must be on for a long enough time to bring the photoreceptor to its maximum exposure at the center of the beam. More specifically, a given point on the photoreceptor must have the complete beam sweep over it to reach its maximum exposure. Line screens consists of lots of regions where individual LEDs are on for a long time. Dot screens (at low densities) are a pattern where individual LEDs are turned on and off rapidly, especially for fine screens. Single pixels do not reach their full exposure.

The width of a single pixel dot in the cross process direction therefore is related to the width of the exposure profile near its maximum. The width of a single pixel line is related to the width of the exposure profile closer to its minimum. If the beam shape depends on how it is focused, the dependence of these two widths can depend in different ways on where the beam is focused through the lens. Making single pixel lines uniform does not necessarily mean that small dots (i.e., fine halftones) will be uniform.

Figure 4:
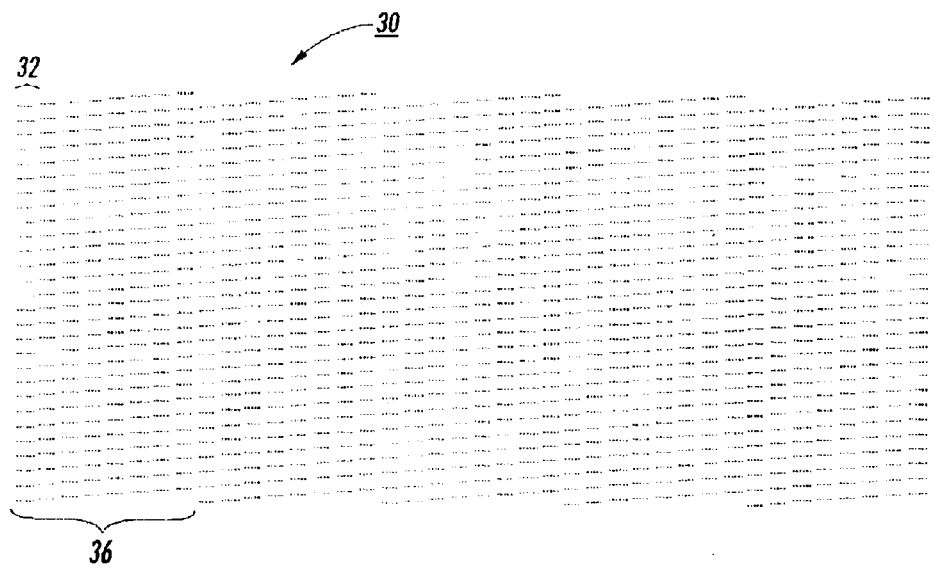
FIG. 4 is still another example of a printed test pattern used in another embodiment of the invention.

Therefore, in order to make fine halftones more uniform, the single pixel solid lines in the test patterns 10, 20 of FIGS. 1 and 2 may be replaced with single pixel dotted lines, as shown in the test pattern 30 of FIG. 4. Multiple dotted lines are arranged in strips 32 and, like in FIGS. 1 and 2, a sequence of strips 46 that represents all the LEDs in the printbar is repeated multiple times. The ratio of the number of pixels on to the number of pixels off is chosen so that the dots are separated when they are printed. When the line width normalization algorithm is run on this test pattern, it measures the single pixel dot width, rather than the single pixel line width. The accuracy of the measurement remains about the same as it is for the single pixel lines. Using the control methodology and the iterative approach results in a single pixel dot that prints the same for each LED. This results in more uniform fine screen halftones, which are typically dominated by single pixel dots.

Figure 5:
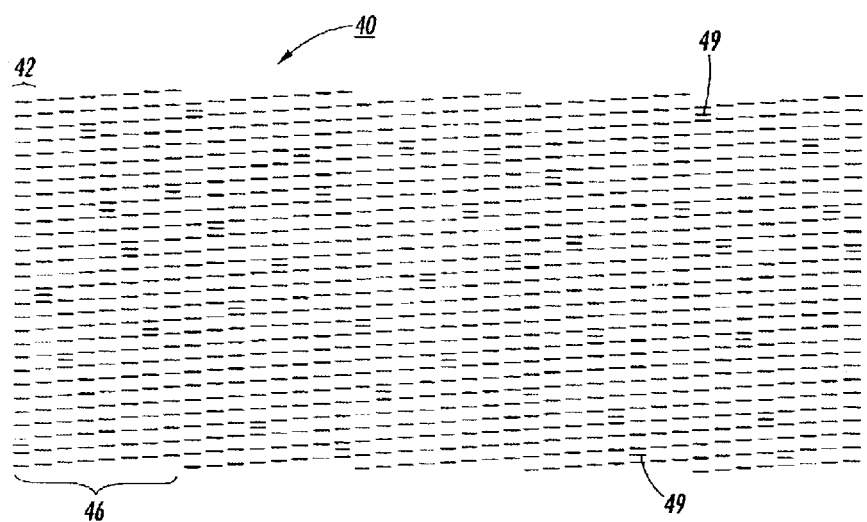
FIG. 5 is yet another example of a printed test pattern used in another embodiment of the invention.

In another embodiment of the invention, another example of a test pattern 40 (FIG. 5) is used to eliminate high frequency streaking. This test pattern 40 maintains the advantages of the test patterns of FIGS. 1, 2, and 4 described above in reducing measurement noise and is much more robust with respect to eliminating high frequency streaking due to printer banding. Like the test patterns of FIGS. 1, 2, and 4, the test pattern 40 of FIG. 5 includes multiple lines in a strip 42, multiple strips 42 form a pattern of strips 46 that represents all the LED intensities, and repeats of the pattern 46 are printed in the overall test pattern 40. However, in each strip 42, the regular line spacing of 1 on n off is replaced with a random spacing 49. Through this test pattern 40, drifting from line to line is eliminated because the strips are tied together by the repeats of random lines 49 across the test pattern 40.

If the banding noise is random from strip to strip, then the test patterns of FIGS. 1, 2, and 4 will be highly successful. However, if the banding becomes small, then a problem will arise. The average line width of one of the strips of lines might truly be smaller than the other strips of lines, within the noise level of $\sigma_{line}/\text{sqrt}(N_{LED}/p)$ discussed above. The control algorithm will eliminate this difference by forcing the strips to have equal width and increase the output of each LED in this line. In the next iteration there will be a true line width difference, but the control algorithm will not recognize the difference. Therefore, each strip of lines can drift relative to the other strips. If the banding is large, random fluctuations will keep forcing this drift back to the same average. However, if banding is small, the drift will not be forced back and a period p will be introduced into the normalization.

This problem arises because the strips are independent of each other. No LED in strip i is used in writing strip j. A solution is to pick a set of LEDs for each strip that meets the following constraints 1) Each line in a strip is separated by at least p from other sets of lines in a strip.

2) If $N_{line}$, is the average number of lines in a strip, then a fraction $N_{line}/N_{LED}$ of the lines in one strip will appear in every other strip.

3) Each single pixel line will be repeated approximately $N_{strip}/(N_{LED}/(N_{line}))$ times, where $N_{strip}$ is the number of strips.

Figure 6:
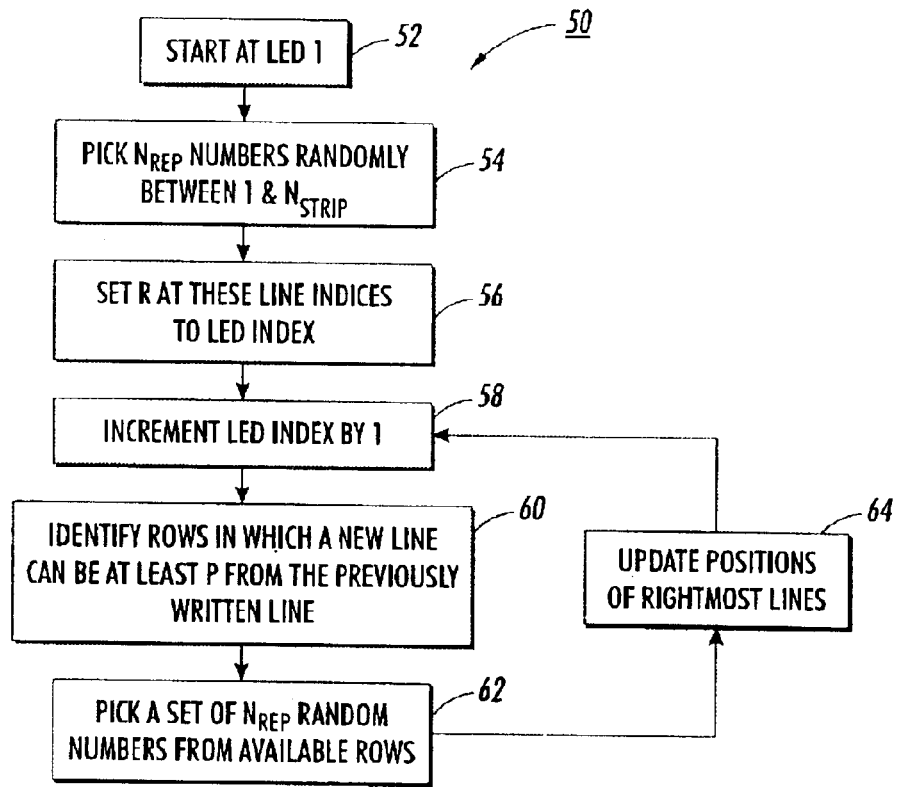
FIG. 6 shows an example of an algorithm that can be used to generate the test pattern depicted in FIG. 5.

A test pattern meeting the above criteria can be generated using the algorithm 50 shown in FIG. 6. The algorithm starts with LED 1 52. Next, the $N_{rep}$ numbers are randomly picked from between one (1) and total number of strips ($N_{strip}$) 54. The rightmost line in the test pattern written so far (R) is set at these line indices to LED index 56. Then, the LED index is incremented by one (1) 58. Strips in which a new line can be at least P from the previously written line are identified 60. Next, a set of $N_{rep}$ random numbers are picked from the available strips 62. Then, the rightmost line in the test pattern written so far (R) is updated 64 and the algorithm returns to step 58.

In the algorithm, R is a vector equal to the number of strips in the test pattern that contain the index of the rightmost line written so far. Other ways of generating a test pattern that meet the following constraints, both in a random way and according so some pattern, would also be satisfactory. Saved along with the test pattern is a key giving the indices of the lines for each strip. Then, upon analysis, when the strip is printed and the width of the lines are found for a particular strip, they can be assigned the correct indices.

In the presence of banding, the normalization procedure for banding noise in the equations above for the test pattern of FIG. 1 can be used. This time, however, a change in the line width due to banding is not confounded with an increase due to an LED's intensity increasing. Increasing the intensities and thus the line width of all the LEDs of a given strip, will increase the line width of a fraction $N_{rep}/N_{strip}$ of all the other lines. The control algorithm will bring the intensities back down to equalize. In the test pattern of FIG. 1, increasing the intensities of one of the lines would have no effect on the other lines except for the repeats of that one line. The latter intensity increase could not be distinguished from banding.

In the embodiments described above, a feedback control-based methodology for adjusting the currents to each LED element in the LED printbar is provided to equalize the width of the lines printed on target media by each element. As a result, streaking in the final print is substantially reduced or eliminated. In summary, the methodology performs the following actions:

1) Measure the width of the line printed on the target media by the LED element (sensing), 2) Compute the error between the measured width and the target width, and "process" this error to determine the adjustment to be made to the LED current (computation of current adjustment using a control law), 3) Adjust the LED current (actuation), and 4) Optionally, repeat steps 1, 2 and 3 until the error between measured line width and target line width is within a predetermined threshold of the desired fine width.

Figure 7:
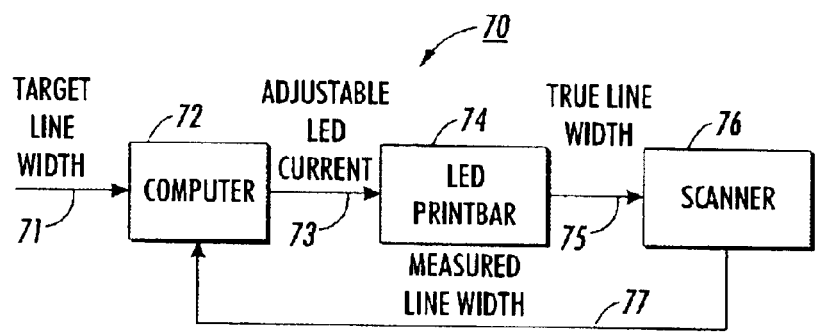
FIG. 7 is a functional diagram of an embodiment of the invention showing pertinent elements of a xerographic system.

In this methodology, a technique to compute the target line-width value in order to minimize the number of saturating (clipping) LEDs is also provided. Moreover, a simple and effective controller architecture for a xerographic device provides an analytical way of selecting the controller parameter to permits a tradeoff of response speed for measurement noise sensitivity in this embodiment. A functional diagram of the methodology showing the pertinent elements of a xerographic device 70 are provided in FIG. 7. The pertinent elements of the xerographic device 70 include a computer 72, an LED printbar 74, and a scanner 76. The pertinent relationships between the elements and external interfaces include the target line width 71, adjustable LED current 73, true line width 75, and measured line width 77.

The computer 72 receives the target line width 71 via an external interface to another component of the xerographic device (e.g., automatically from a storage device, manually from an input device, or derived from the average line widths etc.). The target line width 71 is associated with a test pattern designed to evaluate print uniformity of the xerographic device 70. The computer 72 is in communication with the LED printbar 74 and controls the intensity of individual LEDs via the adjustable LED current 73. The LEDs of the LED printbar 74 form a latent image associated with the test pattern. The latent image is printed by other elements of the xerographic device 70 on a target media. The printed test pattern on the target media bears the true line width 75 for lines of the test pattern and exhibits characteristics of uniformity, or the lack thereof, for the xerographic device 70. The target media and printed test pattern, including the true line width 75 of lines in the test pattern, is transferred (e.g., manually or automatically) to the scanner 76. The scanner 76 scans the target media. The scanner 76 is in communication with the computer 72 and transfers the scan to the computer. An image analysis algorithm in the computer measures the line widths of the printed test pattern. The computer 72 compares the measured line width 77 to the target line width 71 to determine print uniformity or the lack thereof. If nonuniformity is found, the computer 72 adjusts the LED current 73 for individual LEDs of the LED printbar 74. The test pattern may be reprinted and the process may be repeated according to various embodiments of the invention described herein and related alternatives and adaptations.

The quantity of interest, the true line width 75 of the lines printed on the target media by each one of the LEDs, is directly measured. In this way, all the effects introduced by the printing engine of the xerographic device 70 (beam shapes, xerographic effects, etc.) are captured in the measured line width 77. From these measurements and from a selected target line width 71, adjustments to the individual LED currents 73 are computed (via control law) to correct line width deviations from the target line width 71. These adjustments are then applied to the individual LED currents. These actions (measurement-computation-adjustment) may be repeated several times, until the width of all lines are within a predetermined threshold of the target line width.

As an example, from a scan of a one full page image, an image analysis algorithm can be performed to measure the width of the lines printed by each element of the LED printbar 74. As shown, the target line width 71 is input to the computer 72. The computer 72 controls the LED current 73 provided to individual LEDs of the LED printbar 74. The LED printbar 74 causes test pattern lines to be printed on a target media, whereby the true line width 75 are provided to the flatbed scanner. The flatbed scanner scans the image. Through image analysis, the width of lines in the test pattern is detected. The measured line width 77 is communicated as feedback to the computer 72.

A special line pattern containing staggered single pixel lines running in the process direction such that lines from all LEDs fit in one page such as the one shown in FIG. 1 was developed and tested. Details on this line pattern, as well as a discussion on the strategies to accurately estimate line width from the scanner output, are discussed above.

The LED current settings are limited in range and in resolution. For example, the LED current may only be able to be set to one of 64 values (assuming a 6-bit converter is used for the printbar chip, $2^6$ input combinations permit 64 selectable input currents). Saturation (also known as clipping) and quantization effects may seriously deteriorate the ideal expected performance. (By ideal expected performance we mean the performance that would take place if neither quantization nor saturation take place).

Nevertheless, uniformity of the printed line width 76 is the performance metric being optimized in this methodology. This metric is quantified via the line width standard deviation (the lower the standard deviation, the better the uniformity). Other metrics more appropriate than a plain standard deviation, e.g., metrics that take into account the response of the human visual system, can be also used. The average line width value (which, after some iterations of the control algorithm, should be very close to the target line width) is immaterial. If needed, after attaining good line uniformity, xerographic setpoints can be tuned to change the average line width to the desired level. Therefore, the actual value of the target line width 70 is, in principle, irrelevant. What is crucial is the system's ability to achieve (after a few iterations) a low standard deviation for the printed line width 76. For example, too high a target would lead to the saturation of many LEDs, which would not get close to the target and thus degrade the overall line uniformity.

Assuming the printbar has N LED elements, the following are the generic steps of the methodology of the embodiment being described:

1) Select a target line width (wo), and
2) Apply the following algorithm to each LED:
   a) measure the width (wi) of the line printed on the target media by the $i^{th}$ LED,
   b) compare wi against wo and compute the new LED current (ui),
   c) apply current ui to the $i^{th}$ LED, and
   d) repeat the 3 steps above until wi is within a predetermined threshold of wo.

Notice that, as stated earlier, the target wo could be also updated at every time we go through step (a) of the algorithm above.

Figure 8:
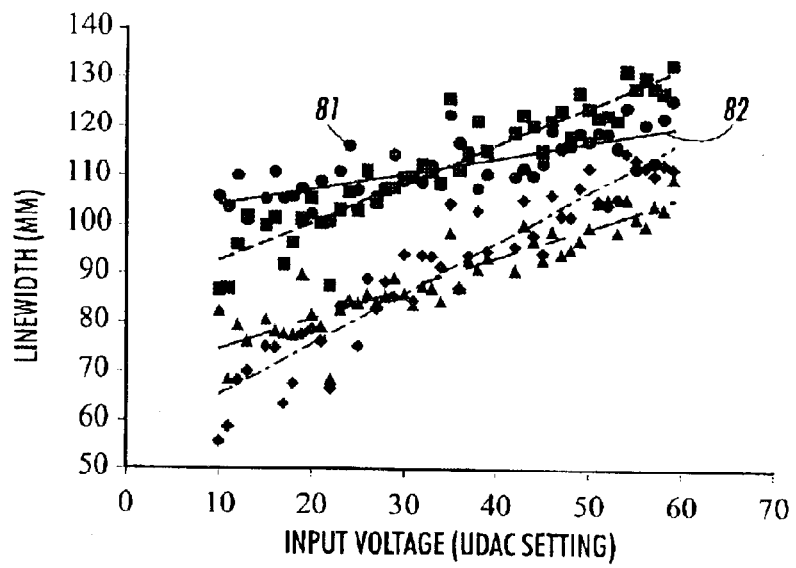
FIG. 8 shows experimental data for four LEDs and corresponding linear fittings.

In a more specific example, assume the LEDs verify the following linear (or, more precisely, affine) relation:

$$wi = gi*ui + hi \qquad (4),$$

where gi and hi are positive constants that vary from LED to LED, wi is the line width, and ui is the LED input current (which can take only a finite number of values, say 0, 1, 2, 62, 63). FIG. 8 shows some experimental data 80 and corresponding line fittings 82. As shown, the linear relation is a reasonably good assumption.

Figure 9:
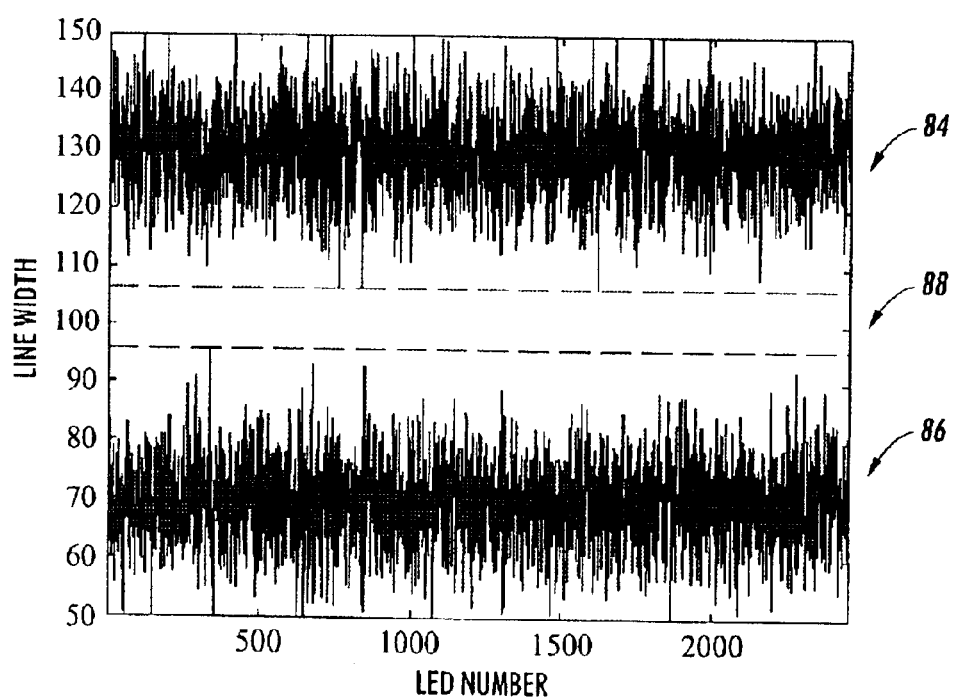
FIG. 9 shows experimental line width measurements for "high" and "low" LED currents.

In the target line width selection stage, equation (4) is used to select wo such that for wi=wo there is a minimum number of saturating LEDs (i.e., the number of LEDs that require ui=0 or ui=63 to achieve wi=wo is as low as possible). Since the values of gi and hi in equation (4) are not known a priori, gi and hi are estimates from a small number (much smaller than in FIG. 8) of preliminary experiments. For instance, from the following two simple experiments: 1) apply a "high" current ui1 (e.g., ui1=60) to all LEDs and measure the corresponding line width wi1, and 2) apply a "low" current ui2 (e.g., ui2=10) to all LEDs and measure the corresponding line width wi2. Using ui1, wi1, ui2, and wi2, the line width is plotted against its current setting for that particular print. From the slope and intercept of this plot, initial values for gi and hi can be determined. Then, using the relation defined in equation (4), estimate the maximum attainable linewidth "wimax" attained by uimax=63 and the minimum attainable linewidth "wimin" for uimin=0. Note that, due to measurement noise, etc., these may be poor estimates; but they are usually good enough for initial purposes. FIG. 9 illustrates wimax 84 and wimin 86 for each LED. In this case, wo may be estimated at any value inside the window 88 shown in FIG. 9 that should not lead to saturating LEDs. Note that if the smallest wimax 84 is smaller than the largest wimin 86, there is no "window" 88. If there is no "window," wo should be estimated to minimize the number of saturating LEDs. Using histograms of wimax 84 and wimin 86 may help determine the best value for wo.

The strategy outlined above to select the target line width (i.e., setting all ui's to a high value, making a print, then to a low value, and making another print) may not produce satisfactory results if the LED sensitivity is confounded with print-to-print noise. Another way of selecting the target line with includes the following steps. I) divide the LEDs into two groups, half of the LEDs in each group, (the indices of these groups are best to be random, but could be assigned according to a pattern; the constraint on the assignment is that each strip in the LED normalization test pattern contains approximately the same number of LEDs from each group), 2) apply a high current ui1 (e.g., ui1=60) to one group of LEDs and apply a low current ui2 (e.g., ui2=10) to the other group of LEDs and measure the corresponding line width (wi), 3) switch the assignments and apply the low current to the first group and the high current to the other group. In this method of selecting the target line width, the average line width should be approximately the same in each print and this fact is used to "correct" the individual measured lines wi1 and wi2. From ui1, wi1, ui2, wi2, and the knowledge of which LED is in which group, gi and hi are estimated, and then using the relation defined in equation (4), wimax for uimax=63 and wimin for uimin=0 are determined. Alternatively, and more generally, the LEDs can be divided into L groups and a ui value for each group can be determined. A different ui is assigned in sequence to each group and a print is made for each assignment.

Another alternative is to vary the target line width (wo) after each iteration (print) to be equal to the measured average line width. This wo(k) may be better than a constant wo under circumstances of high print-to-print noise. The analysis below, however, assumes that wo is constant throughout the iterations.

In the identification and controller design stage, once the target line width (wo) is selected, equation (4) is computed using the gi and hi values previously obtained and the uio that would give wi=wo for each LED (if the computed uio is out of range (e.g., >63 or <0) an actual uio closest to an in-range value should be used). Next, apply these currents and measure the resulting wio (generally different from wo). Now, there are at least three experimental input current -line width values: 1) ui1 and wi1, 2) ui2 and wi2, and 3) uio and wio. Using, for example, least squares approximation, the parameters gi and hi are recomputed using equation (4). This is the model used for the design of the controller. There are many control architectures or structures that can be used, and here we use a simple and effective "single-input single-output integral control law" described by the following equation:

$$ui(k+1)=ui(k)F*(wi(k)-wo), k=0, 1, 2, \ldots, ui(0)=uio \quad (5)$$

where k denotes the iteration number, and wi(k) is the line width measured in the $k^{th}$ iteration; i.e., obtained in response to current ui(k). The constant F is thus the only controller parameter and its selection is explained in more detail below. It is well known in control theory that integral, laws guarantee that, for a stable closed loop, perfect tracking to a constant reference is ideally attained (i.e., wi(k)=wo in steady-state). In actuality, the values of ui(k) should be quantized and saturated, but for simplification this is ignored in this analysis. Notice that it is not necessary to use the same gain F for all loops, we do this here to simplify the controller implementation, but better results can be achieved if we take different Fi's, i=1,2, . . .

In the feedback control stage, the control law described in equation (5) is applied. That is, at each iteration wi(k) is measured (i.e., the printed line pattern is scanned and post-processing is performed). Then, the measured line width is compared to the target line width wo, and then the actual current ui(k) is used to compute the next current ui(k+1) (using (5)). This process is repeated a number of times until we see that the measured line width wi(k) is within a predetermined threshold of the target line width wo. These steady-state values LED current ui(k) are the current values used in the final implementation.

The following paragraphs further define the models and notation used in the embodiment of the invention being described. Certain variables and mathematical expressions are defined as follows:

wo desired (or target) line width for all LEDs wi(k) measured line width at iteration number k, k=0, 1, 2, . . .

dwi(k)=wi(k)−wo incremental (differential) line width for LED i at iteration k uoi nominal (initial) current setting for LED i ui(k) current setting for LED i at iteration k dui(k)=ui(k)−uoi incremental current setting for LED i at iteration k vi(k) measurement noise for LED i at iteration k The measured line width corresponding to the $i^{th}$ LED is modeled by the following equation:

$$wi(k)=gi*ui(k)+hi+vi(k) \quad (6).$$

Since $$wo=gi*uio+hi \quad (7),$$

dwi becomes $$dwi(k)=gi*dui(k)+vi(k) \quad (8).$$

The correction currents are computed using the following integral control law:

$$dui(k+1)=dui(k)+F*dwi(k) \quad (9)$$

or equivalently (as shown in (5))

$$ui(k+1)=ui(k)-F*(wi(k)-woi) \quad (10)$$

where F is the control parameter.

The interconnection between equations (8) and (9) yields the following incremental closed-loop system equation:

$$dui(k+1)=(1-F*gi)*dui(k)-F*vi(k) \quad (11)$$

or equivalently $$dwi(k+1)=(1-F*gi)*dwi(k)+vi(k+1)-vi(k) \quad (12)$$

Figure 10:
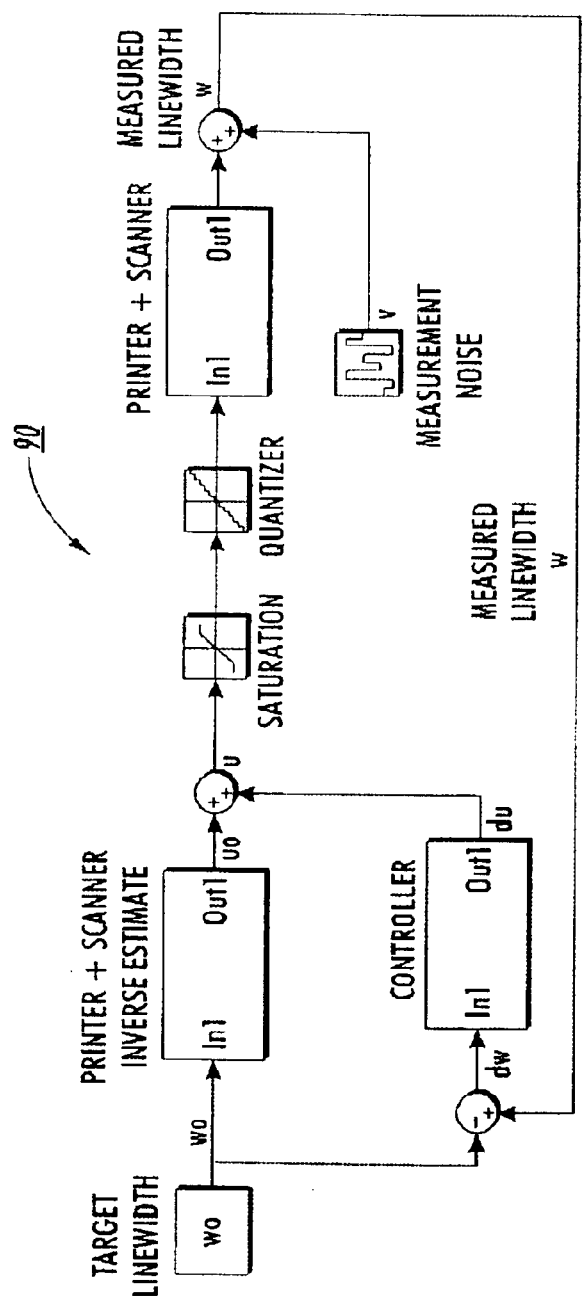
FIG. 10 shows the block diagram used for some illustrative simulations.

The (non-incremental) closed-loop interconnection is depicted in FIG. 10, which actually shows the block diagram used for the simulations described later. The control parameter F is expressed as:

$$F=f/go \quad (13)$$

where f is a constant to be selected and go is a given "expected value" for gi. Consider a "nominal LED" (or average LED) with gi=go. For this nominal LED, equation (11) becomes:

$$dui(k+1)=(1-f)*dui(k)-(f/go)*vi(k) \quad (14)$$

The constant f is selected by focusing on both robust stability and robust performance of the closed-loop. Robust stability is achieved if the controller stabilizes all LEDs; thus this is a fundamental property since it guarantees that all LED will (in theory, at least) converge after a number of iterations. From equation (11) it is seen that all closed loops will be stable if constant f is selected such that:

$$|1-f*gi/go|<1 \quad (15)$$

or $$0<f<2*go/gmax \quad (16)$$

where gmax denotes the maximum overall gi.

Assume the performance of the nominal closed-loop is measured by the following two metrics: 1) the speed of response, and 2) the amplification of the measurement noise. In other words, the constant f is selected to achieve fast response (and in a few iterations correct an initial line width that is different from the target line width), as well as to achieve low noise amplification.

Consider the "speed of response" metric. Set vi=0 (no noise). Under these conditions, the closed-loop response to an initial condition dwi(0) is given by the following equation:

$$dwi(k)=(1-f*gi/go)^k*dwi(0) \quad (17).$$

Therefore, provided that $|1-f*gi/go|<1$ (which is the stability condition in (15)), the number of iterations k=k2 needed to achieve $|dwi(k2)/dwi(0)|<0.02$ (this is usually called the 2% time response) is given by the following equation:

$$k2=\log (0.02)/\log (|1-f*gi/go|) \quad (18).$$

Therefore, the speed of response is determined by $|1-f*gi/go|$. The smaller this value the faster the response.

Consider now the "amplification of measurement noise" metric. Let a stable closed-loop, with a random zero mean measurement noise vi of standard deviation sdev_vi. Therefore, the standard deviation of dwi is given by the following equation:

$$sdev\_dwi=NG*sdev\_vi \quad (19)$$

where NG is the "noise gain" and is computed using the following equation:

$$NG=1/(1-(f*gi/go))^{1/2} \quad (20)$$

(NG is the $H_2$-norm of the discrete-time closed-loop map from vi to dwi in Control System jargon.) Notice that the standard deviation of the true line-width dwti:=dwi-vi, is thus given by the following equation:

$$sdev\_dwti=((NG^2-1)^{\wedge}0.5)*sdev\_vi \quad (21)$$

Notice that the two metrics considered do "conflict." In other words, the better the design is made with respect to (wrt) one metric the worse the design is to (wrt) the other metric.

From the linear fittings of experimental data, gmax=1.18, go=0.55, and gmin=0.31. Then, from equation (11), for robust stability the constant f should be selected such that 0<f<0.93.

Figure 11:
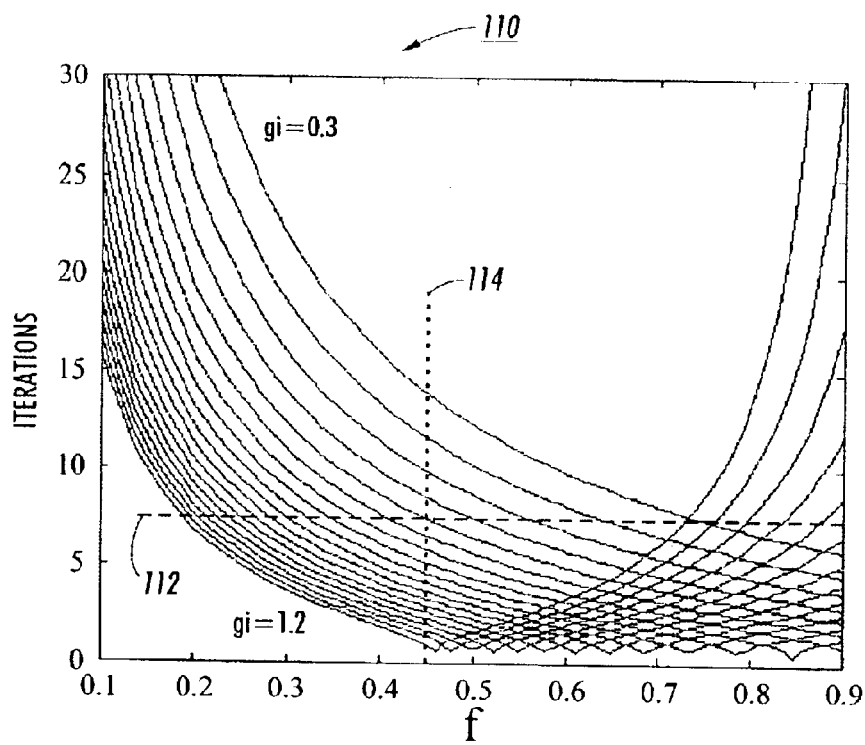
FIG. 11 shows a family of curves relating 2% time responses to the controller parameter f for different values of the sensitivity gi of the printed line-width with respect to LED input current.

FIG. 11 shows the number k2 of iterations necessary to achieve a 2% error (without measurement noise and without quantization of ui(k)) as a function of constant f, parameterized in gi. The family of curves 110 shows the 2% time response versus controller parameter f. Each curve corresponds to a different value of gi, spanning the range [0.3, 1.2].

Figure 12:
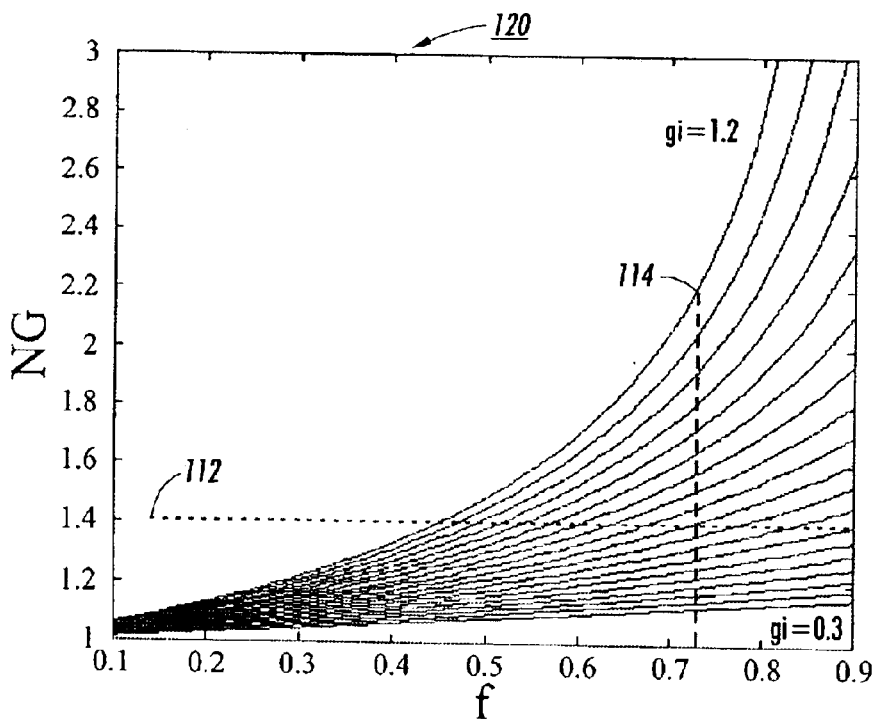
FIG. 12 shows a family of curves relating noise gain NG (or amplification of measurement noise) to the controller parameter f for different values of the sensitivity gi of the printed line-width with respect to LED input current.

FIG. 12 shows the measurement noise gain (NG) as a function of the controller constant f, parameterized in gi. Notice that the constant f varies from 0.1 to 0.9, so robust stability is achieved for all points on the curves. The family of curves 120 shows the NG versus controller parameter f. Each curve corresponds to a different value of gi, spanning from 0.3 to 1.2.

As an example of a design methodology, FIGS. 11 and 12 may be used to select the value of constant f For example, from FIG. 1I note that at least eight (8) iterations are needed to achieve a 2% error for all LEDs. This holds for constant f=0.73, which from FIG. 12 gives a noise gain NG<2.2 (see horizontal dashed line 112 in FIG. 11 and vertical dashed line 122 in FIG. 12). As another example, if the level of noise in the true line width is assumed to be no larger than the measurement noise level (i.e., NG^2−1=1 or NG=1.41) for all LEDs (see horizontal dashed line 124 in FIG. 12), constant fis<0.45 (see vertical dashed line 114 in FIG. 11), and thus at least 16 iterations will be needed for all LEDs to achieve 2% error.

In the following simulation example a target line width wo equal to 106 $\mu$m was used in order to minimize the number of LEDs that would saturate when wi=wo.

The controller design in equation (5) (integral control, same controller for all LEDs) was used and the controller parameter F=1.27 (i.e., t=0.7, for go=0.55) was selected. From the analysis of controller parameter F above, for f=0.7 a steady state is expected to be achieved after approximately nine iterations and noise amplification gain is expected to be slightly above two for the worst case LED.

Figure 13:
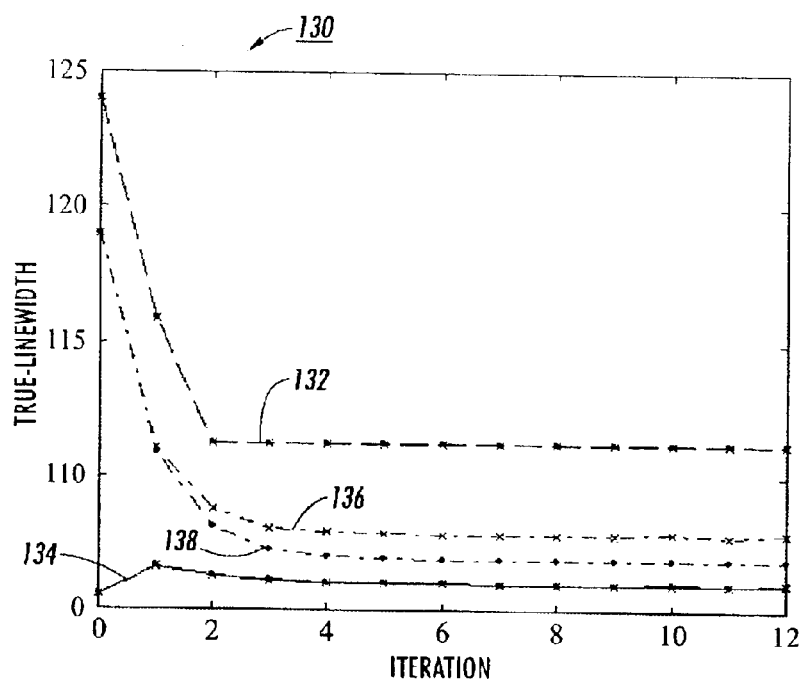
FIG. 13 shows simulated data relating line width to number of iterations.

The model described above is used for numerical simulations. The measurement noise has a zero mean and a standard deviation sdev_vi=1.06 (in agreement with experimental data). Roughly speaking, after the fifth iteration the steady state was achieved. FIG. 13 shows the line width versus iteration number 130. The maximum plots 132 were found for saturation of one of the LEDs. Therefore, noisy and non-noisy cases coincide. The mean plots 134 were around wo=106 with small fluctuations, in both cases. For the mean +2*standard deviation plots the noisy case 136 was above the non-noisy case 138, as expected. In the non-noisy case 136, deviations still exist due to quantization and saturation of the LED current settings. The following table collects some values of interest from the plots in FIG. 13.

| | Mean at k = 10 | Std. Dev. At k = 10 | Maximum at k = 10 |
|---|---|---|---|
| Without meas. noise | 106 | 0.43 | 111.2 |
| With meas. noise | 106 | 0.92 | 111.2 |

Figure 14:
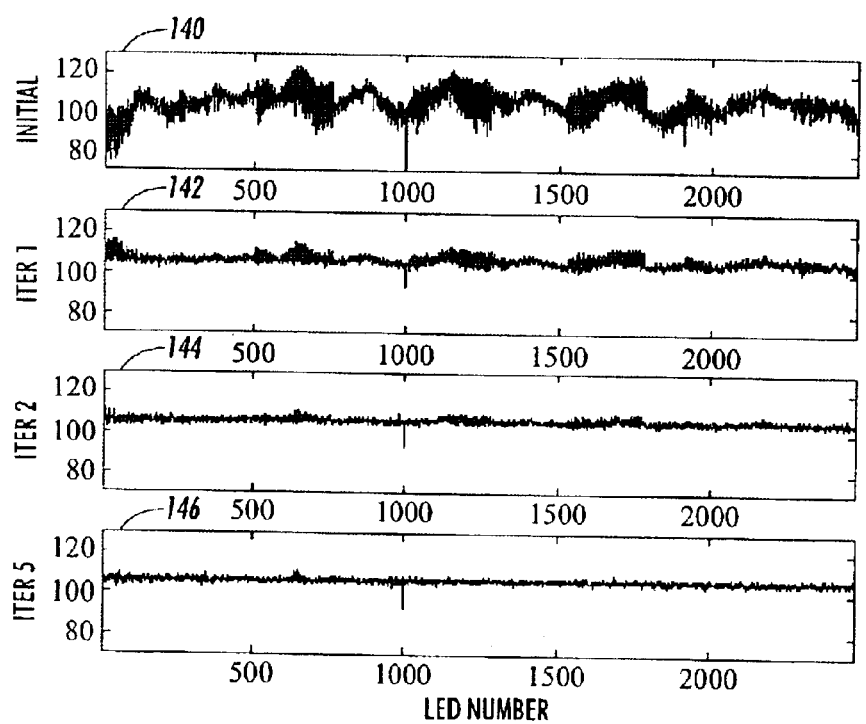
FIG. 14 shows simulated data relating line width to LED number for different iterations.
Figure 15:
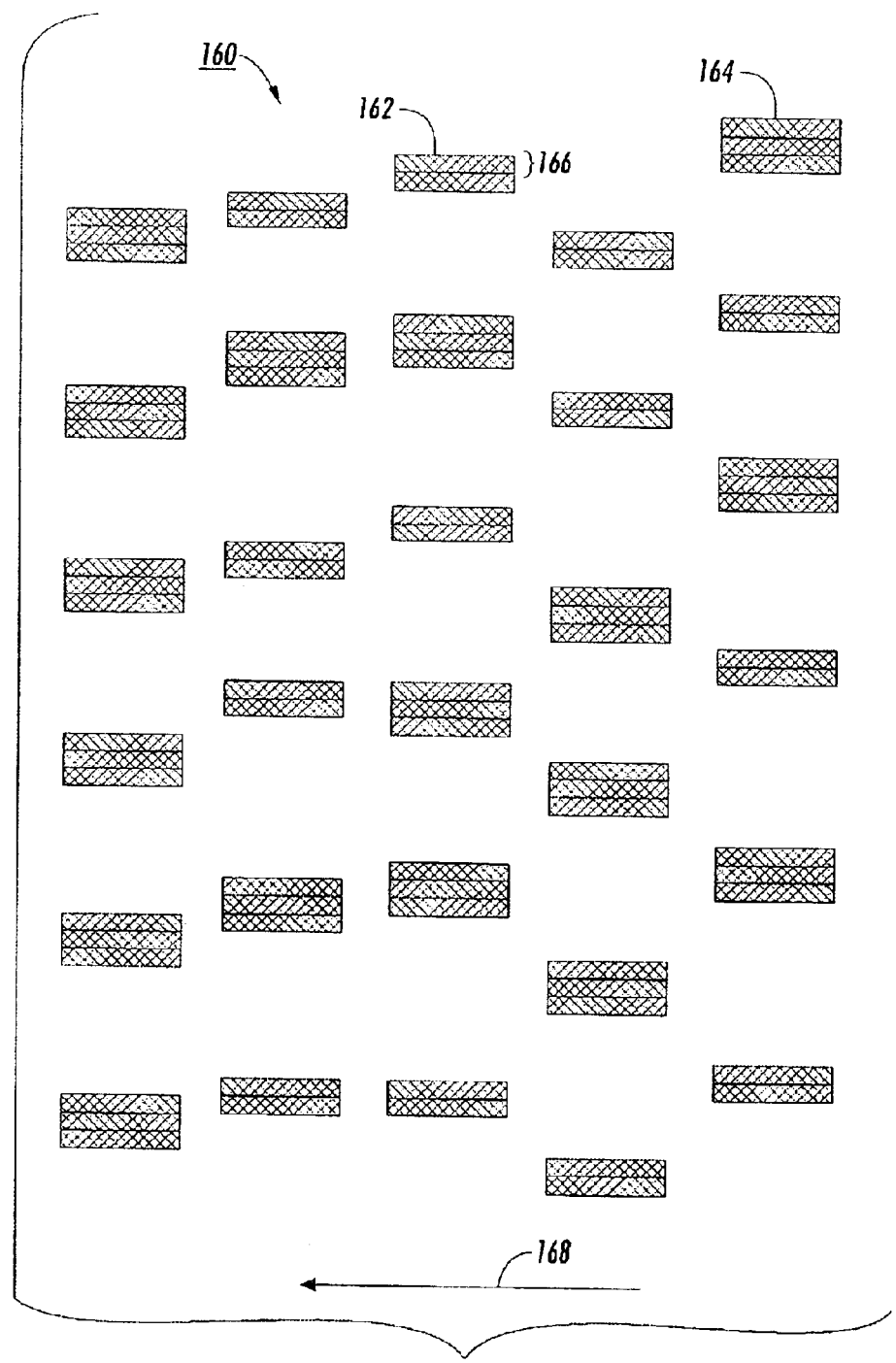
FIG. 15 shows a section of still yet another example of a printed test pattern used in another embodiment of the invention.

FIG. 14 shows the true line width for the initial LED settings ui(0)=uio 140 and for settings computed for the first control iteration, 142, second control iteration, 144, and fifth control iteration 146 (all four plots are in the same scale). Note that the line width converges to the target and also notice some spikes given by the saturation of the LED current settings. The actual currents are saturated and quantized due to the finite number of dots available in the control chip for the printbar; saturations occur at ui=0 and at ui=63. Note that that the spike around the 1000th LED in all plots in FIG. 15 is due to this setting being saturated at 63.

Checking the predicted standard deviation against the simulated standard deviation, according to the simulations (averaging over all 2481 noise sources for 80 iterations in steady state) a line width standard deviation of 1.34 was obtained. The prediction (for nominal LED with gi=go= 0.55) of $(1/(1-f/2))^{1/2} * 1.06 = 1.32$, which is very close to the predicted value of 1.34.

For 600 spot per inch (spi) and lower resolution LED printbar imagers, single pixel lines can be written and used to monitor the light output as described above. However, for LED printbar imagers with resolutions higher than 600 spi (e.g., 1200 spi), the single pixel line approach is not as successful, because single lines at higher than 600 spi resolution often do not sufficiently expose the imaging member to allow toner to develop. In another embodiment of the invention, a test pattern with double pixel lines and triple pixel lines is used as a mechanism to monitor and adjust print uniformity for individual LEDs in an LED printbar. The actual width of the double and triple pixel lines depends on the current settings for the two or three LEDs used to write the lines. In this embodiment an algorithm that determines the correction to individual LEDs by processing the double line width and the triple pixel line width is provided. From a special test pattern, the double pixel line width and triple pixel line width for all LEDs are determined. FIG. 15 shows a section 160 of an exemplary test pattern for adjusting the LED current of the higher resolution printbars.

Similar to the methods for other embodiments described above, the test pattern is printed, scanned, and analyzed to extract uniformity information. A matrix equation is solved in order to determine the single pixel exposure uniformity. From this uniformity information, new exposure setpoints are loaded into the LED imager. The adjustments can be made directly or the process can be repeated using an iterative approach to make it less sensitive to noise.

The embodiment being described extracts individual LED responses resulting from writing line pairs. Double pixel lines will indeed print out for an LED imager with greater than 600 dpi resolution. However, since the width of the line is due to the contribution from two LEDs, the response of each individual LED must be extracted.

If there are N imagers on the printbar, then there are N−1 possible line pairs that can be written. However, this is still not enough information to uniquely extract the response of individual LEDs. The instability of line pairs is straightforward to those skilled in the art. If all the LED exposures were equal, all the double pixel lines would have the same width. However, if the exposures of all the odd LEDs were at a high exposure and all the even LEDs were at a low exposure, the double pixel line width may also all be equal. The test pattern would look nice and uniform, but when the imager was used to write halftones, they would contain distortion because of the unnoticed odd/even asymmetry.

This embodiment of the invention uses a test pattern containing both double pixel lines and triple pixel lines to extract the response of individual LEDs. FIG. 15 shows a section 160 of an exemplary test pattern with double pixel lines 162 and triple pixel lines 164. For clarity, the width of a rectangle 166 in FIG. 15 is the width of a single pixel line. The process direction in the direction of arrow 168. The arrangement of the double pixel lines and triple pixel lines and the position of all the lines is random. This helps minimize the sensitivity to noise. A key is stored so that during analysis, each line can be associated with the LEDs that wrote the line. There is a minimum spacing between the lines of approximately seven (7) pixels so that the line width measurements are independent.

If an odd/even asymmetry occurs in the double pixel lines, it causes the triple pixel lines to have different widths. There arc (N−1)+(N−2) dependent variables and N independent variables, so the system is overdetermined. However, a least squares solution of these equations can be used to find a set of N LED exposure setpoints to best make equal all the double pixel lines and all the triple pixel lines. The embodiment being described produces a solution technique that is stable and an iterative control methodology that can be used to minimize the line width measurement noise.

The printed double pixel line width is a function of exposure. For small changes about the desired uniform exposure, the line width change should be linear with an exposure increase. The sensitivity coefficient should be the same for the left pixel and the right pixel because of symmetry. Therefore, the change $\Delta w_{i,j+1}$ in the double pixel line width is:

$$\Delta w_{i,i+1} = \left(\frac{dw_2}{de}\right)\Delta e_{i+1} + \left(\frac{dw_2}{de}\right)\Delta e_{i+1}, \quad (22)$$

where $\Delta e_i$ and $\Delta e_{i+1}$ are the change in exposure of the left and right lines, respectively, and $dw_2/de$ is the sensitivity coefficient.

The triple pixel line width is also linear for small changes in exposure. However, the sensitivity is different for changes in the middle pixel compared to changes in the edge pixels. Therefore, the change $\Delta w_{i-1,i+1}$ in the triple pixel line width is:

$$\Delta w_{i-1,i+1} = \left(\frac{dw_3}{de}\right)\Delta e_{i-1} + \left(\frac{dw_m}{de}\right)\Delta e_i + \left(\frac{dw_3}{de}\right)\Delta e_{i+1}, \quad (23)$$

where $\Delta e_{i-1}$, $\Delta e_i$, and $\Delta e_{i+1}$ are the change in the exposure of the left, middle, and right lines respectively. $dw3/de$ is the sensitivity to changing an edge line and $dw_m/de$ is the sensitivity to changing the middle line.

Equation (22) leads to a set of N−1 linear equations, and equation (23) leads to a set of N−2 linear equations. These can be combined into the matrix equation:

$$\begin{pmatrix} \frac{\partial w_2}{\partial e} & \frac{\partial w_2}{\partial e} & & & & & \\ & \frac{\partial w_2}{\partial e} & \frac{\partial w_2}{\partial e} & & & & \\ & & \ddots & & & & \\ & & & & \frac{\partial w_2}{\partial e} & \frac{\partial w_2}{\partial e} & \\ \frac{\partial w_3}{\partial e} & \frac{\partial w_3}{\partial e} & \frac{\partial w_3}{\partial e} & & & & \\ & \frac{\partial w_3}{\partial e} & \frac{\partial w_3}{\partial e} & \frac{\partial w_3}{\partial e} & & & \\ & & \ddots & & & & \\ & & & & \frac{\partial w_3}{\partial e} & \frac{\partial w_3}{\partial e} & \frac{\partial w_3}{\partial e} \end{pmatrix} \begin{pmatrix} \Delta e_1 \\ \Delta e_2 \\ \Delta e_3 \\ \vdots \\ \Delta e_{N-1} \\ \Delta e_N \end{pmatrix} = \quad (24)$$

$$\begin{pmatrix} \Delta w_{12} \\ \Delta w_{23} \\ \vdots \\ \Delta w_{N-1,N} \\ \Delta w_{13} \\ \Delta w_{24} \\ \vdots \\ \Delta w_{N-2,N} \end{pmatrix}.$$

The matrix is (N−1)+(N−2) rows by N columns, so the set of equations are overdetermined. There is no set of N Δe's that can simultaneous satisfy the (N−1)+(N−2) set of linear equations. However, the use of the Moore-Penrose pseudo-inverse in MATLAB provides a simple way to calculate the least squares solution and is used in the simulations that follow.

To identify the ability of the algorithm for the embodiment being described to solve for the best LED uniformity in the presence of noise, a solution of the problem is simulated. The simulation has the following features: 1) each LED can be individually adjusted with 64 equally spaced steps using the $U_{DAC}$ actuator and 2) exposure is proportional to the $U_{DAC}$ setting. The proportionality constant and the offset are different for each $U_{DAC}$. In the simulation, the proportionality constants and offsets are chosen from a normal distribution.

In a first simulation, an offset exposure (i.e., the exposure when $U_{DAC}=0$) with a mean of 0.5 and a standard deviation of 0.1 is chosen. An average sensitivity of 1/63 with a standard deviation of 0.1/63 is chosen. This was chosen to make the average exposure one (1) when the $U_{DACS}$ are set to their midpoints at 31. An average line width for a double pixel line of 2/600 inch at the $U_{DAC}$ midpoint is chosen. An average line width for a triple pixel line of 3/600 inch at the $U_{DAC}$ midpoint is chosen.

Figure 16A:
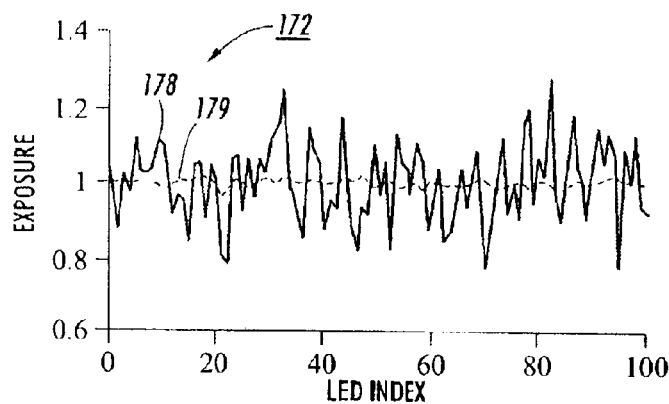
FIGS. 16A–16C shows experimental data indicating the effectiveness of correction on exposure profile, double pixel line width, and triple pixel line width.
Figure 16B:
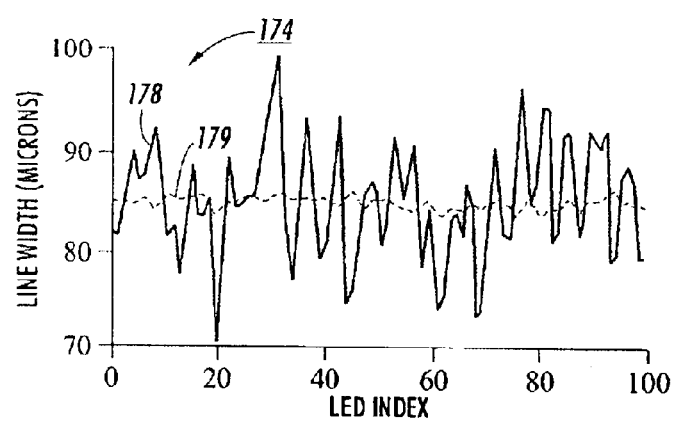
Figure 16C:
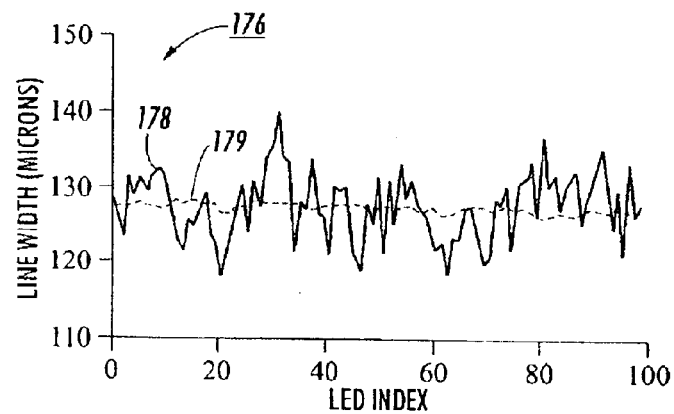

The results of the first simulation are shown in FIGS. 6A–16C. One hundred LEDs were simulated. The dashed line 178 in each graph is before the correction and the solid line 179 is after the correction. The graph 172 of FIG. 16A plots the exposure as a function of LED index. The graph 174 of FIG. 16B plots the width of double pixel lines and the graph 176 of FIG. 16C plots the width of triple pixel lines. From FIGS. 16A–16C, the matrix equation (24) provides a good technique to write uniform lines. The standard deviation of the double pixel line width is decreased from 5.67 μm to 0.59 μm and the standard deviation of the triple pixel line width is decreased from 4.61 μm to 0.50 μm.

In the presence of line width measurement noise, an iterative approach can be used. The matrix equation (24) is solved, but instead of making the full correction to the $U_{DACS}$ based on the corrected exposures, a partial correction of fraction f is made. Then, the lines are printed and measured again and the process is repeated until the best possible uniformity is achieved.

Figure 17:
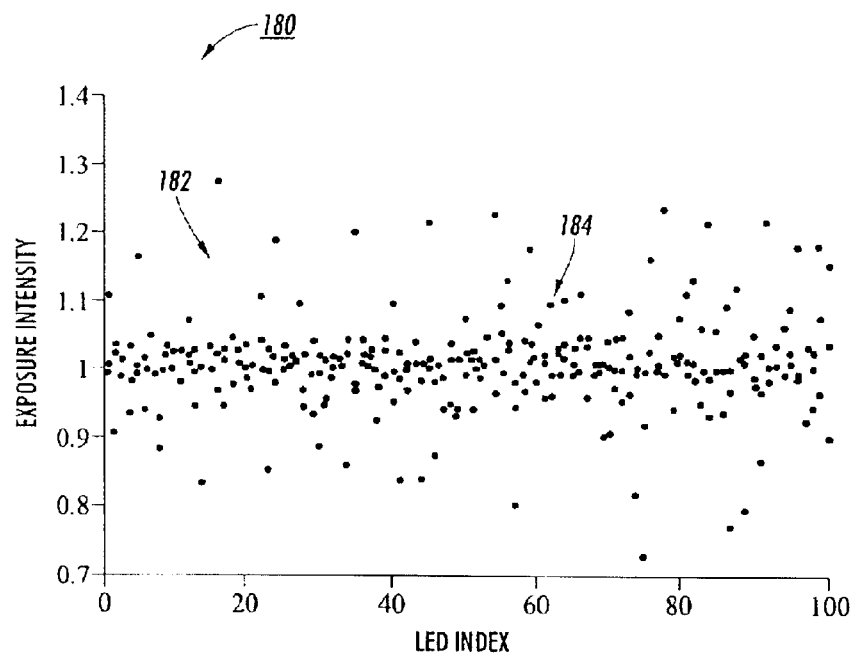
FIG. 17 shows experimental data relating the effectiveness of single scans and repeated iterations of fractional adjustments on the exposure profile.

An example of this process is illustrated by the exposure intensity versus LED index profile 180 in FIG. 17. A line width noise measurement error with a standard deviation of 2 μm was added. Before the correction, the exposure profile had a standard deviation of 0.1128 (dashed line 182, FIG. 17). If the full correction was attempted with a single measurement, the exposure profile standard deviation would be 0.0379 (solid line 184, FIG. 17). However, by choosing an iteration gain of 0.25 and performing multiple iterations, the exposure profile standard deviation decreases to 0.0153.

The invention presented here is generalized for a 1200 spi LED imager. However, even higher resolution imagers can be adjusted, as long as enough m-tuple, (m+1)-tuple, and so on lines are written so that there are more items measured than LEDs to adjust. Enough line combinations must be written so that the set of linear equations is exactly determined or over determined.

This procedure may be implemented to make LEDs in LED light bars uniform after manufacture of the printer. Before the printer is shipped to the customer, a series of iterations is run to make the line width (or dot width) uniform. This not only makes the LED bar uniform, but eliminates streaking that might be due to other xerographic subsystems.

Another implementation is to correct for streaking that appears as the machine ages, both due to the LED bar and other xerographic subsystems. One of the failure modes of LED bars is that as the elements age (differently), their light output drops. This drop can be estimated from the time each LED element has been on. If this on time is too long, the machine diagnostics can initiate a service call or even ask the customer to perform the normalization procedure.

Yet another implementation is to compensate for other xerographic subsystem failures. For example, contamination of the charging subsystem in a xerographic printer can introduce objectionable streaks into a print. If this printer had an LED imager, the print could be scanned and the LED intensities could be adjusted to attempt to compensate for the charger failure. This could increase the life of the machine during the charger failure condition.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof

What is claimed is:

1. A method of adjusting print uniformity for a xerographic device having an LED printbar, the method comprising the following steps:
    a) printing a test pattern line on a target media in the process direction of the xerographic device, wherein the test pattern line is associated with an individual LED of the LED printbar,
    b) transferring the target media with the printed test pattern line to a scanner;
    c) scanning the target media and detecting the printed test pattern line;
    d) communicating detected test pattern line information to a computer;
    e) determining a measured metric from the detected test pattern line information;
    f) calculating the difference between the measured metric and a target value; and
    g) if the absolute value of the difference exceeds a first predetermined threshold, adjusting the current supplied to the individual LED associated with the test pattern line by a fraction of the difference to partially reduce the difference.

2. The method of claim 1, wherein the measured metric is selected from the group of metrics consisting of a summed line reflectance metric, an integrated line reflectance metric, a minimum line reflectance metric, and a line width metric.

3. The method of claim 1, before step a) further including the step:
h) adjusting the current supplied to each LED of the LED printbar to a midrange value.

4. The method of claim 1, further including the steps:
h) iteratively performing steps a) through g) until the absolute value of the difference between the measured metric and the target value in step f) is less than or equal to the first predetermined threshold.

5. The method of claim 1, further including the step:
h) performing steps a) through g) for each LED of the LED printbar, wherein each test pattern line is spaced from adjacent test pattern lines.

6. The method of claim 5, wherein step a) prints a test pattern including a set of strips of multiple test pattern lines, wherein each strip is in the cross-process direction of the xerographic device, and wherein each strip includes a repetitive sequence of a test pattern line and n blank lines.

7. The method of claim 6, further including the step:
i) performing steps a) through h) for each LED of the LED printbar two or more times.

8. The method of claim 1, wherein the test pattern line printed in step a) is a dotted line.

9. The method of claim 8, before step a) further including the step:
h) adjusting the current supplied to each LED of the LED printbar to a midrange value.

10. The method of claim 8, further including the steps:
h) iteratively performing steps a) through g) until the absolute value of the difference between the measured metric and the target value in step f) is less than or equal to the first predetermined threshold.

11. The method of claim 8, further including the step:
h) performing steps a) through g) for each LED of the LED printbar, wherein each test pattern line is spaced from adjacent test pattern lines.

12. The method of claim 11, wherein step a) prints a test pattern including a set of strips of multiple test pattern lines, wherein each strip is in the cross-process direction of the xerographic device, and wherein each strip includes a repetitive sequence of a test pattern line and n blank lines.

13. The method of claim 12, further including the step:
i) performing steps a) through h) for each LED of the LED printbar two or more times.

14. The method of claim 12 wherein each of the strips of multiple test pattern lines in the test pattern printed in step a) includes a set of random lines in random positions, wherein each random line is associated with an individual LED of the LED printbar, and wherein each random line is printed between and spaced from adjacent test pattern lines, wherein the arrangement of random lines across the strips includes multiple repeats of lines associated with each LED.

15. The method of claim 14, further including the following steps to determine a quantity and a location of random lines in the test pattern:
i) spacing each random line in a strip by at least p from adjacent test pattern lines;
j) randomly printing $N_{line}/N_{LED}$ times the number test pattern lines in a strip in every other strip; and
k) printing each random line approximately $N_{strip}/(N_{line}/N_{LED})$ times in the test pattern.

16. The method of claim 12, wherein the measured metric is a line width metric.

17. The method of claim 16, between steps e) and f) further including the step:
i) calculating an average line width for the printed test pattern lines from the measured line widths and using the result as the target value.

18. The method of claim 16, between steps e) and f) further including the step:
i) calculating a first average line width ($w_j$) for each strip of test pattern lines from the measured line widths for all the printed test pattern lines in the strip;
j) calculating a second average line width (w) from the first average line widths ($w_j$) for each strip of the test pattern;
k) calculating the difference between the second average line width (w) and the first average line width ($w_j$) for each strip of the test pattern;
l) if the absolute value of the difference exceeds a second predetermined threshold, normalizing the measured line width for each test pattern line (i) in each strip (j) where the absolute value of the difference exceeds the second predetermined threshold using the following equation: $w^0_{ij}=w^m_{ij}-(w_j)+(w)$, wherein $w^m_{ij}$ is the measured line width of line i in strip j and $w^0_{ij}$ is the normalized measured line width of line i in strip j; and
m) in step f), for each normalized measured line width, calculating the difference between the normalized measured line width and the target value.

19. The method of claim 16, further including the steps:
i) in step g), if the absolute value of the difference exceeds the first predetermined threshold, adjusting the current supplied to the individual LED associated with the test pattern line by a fraction of the difference to partially reduce the difference; and
j) iteratively performing steps a) through i) until the absolute value of the difference between the measured line width and the target value in step f) is less than or equal to the first predetermined threshold.

20. A method of adjusting print uniformity for a xerographic device having an LED printbar, the method comprising the following steps:
a) printing a test pattern on a target media, wherein the test pattern includes a set of strips of multiple test pattern lines, wherein each test pattern line is in the process direction of the xerographic device, wherein each test pattern line is associated with an individual LED of the LED printbar, wherein each strip is in the cross-process direction of the xerographic device, and wherein each strip includes a repetitive sequence of a test pattern line and n blank lines;
b) transferring the target media with the printed test pattern to a scanner;
c) scanning the target media and detecting each printed test pattern line;
d) communicating detected test pattern line information to a computer;
e) determining a measured metric from the detected test pattern line information;
f) calculating the difference between the measured metric and a target value; and
g) if the absolute value of the difference exceeds a first predetermined threshold, adjusting the current supplied to the individual LED associated with the test pattern line to reduce the difference;

wherein each of the strips of multiple test pattern lines in the test pattern printed in step a) include a set of random lines, wherein each random line is associated with an individual LED of the LED printbar, and wherein each random line is printed between and spaced from adjacent test pattern lines.

21. The method of claim 20, further including the following steps to determine a quantity and a location of random lines in the test pattern:
   i) spacing each random line in a strip by at least p from adjacent test pattern lines;
   j) randomly printing $N_{line}/N_{LED}$ times the number test pattern lines in a strip in every other strip; and
   k) printing each random line approximately $N_{strip}/(N_{line}/N_{LED})$ times in the test pattern.

22. A method of adjusting print uniformity for a xerographic device having an LED printbar, the method comprising the following steps:
   a) printing a test pattern on a target media, wherein the test pattern includes a set of strips of multiple test pattern lines, wherein each test pattern line is in the process direction of the xerographic device, wherein each test pattern line is associated with an individual LED of the LED printbar, wherein each strip is in the cross-process direction of the xerographic device, and wherein each strip includes a repetitive sequence of a test pattern line and n blank lines;
   b) transferring the target media with the printed test pattern to a scanner;
   c) scanning the target media and detecting each printed test pattern line;
   d) communicating detected test pattern line information to a computer;
   e) determining a measured metric from the detected test pattern line information;
   ) calculating the difference between the measured metric and a target value; and
   g) if the absolute value of the difference exceeds a first predetermined threshold, adjusting the current supplied to the individual LED associated with the test pattern line to reduce the difference;
   wherein the measured metric is a line width metric.

23. The method of claim 22, between steps e) and f) further including the step:
   i) calculating an average line width for the printed test pattern lines from the measured line widths and using the result as the target value.

24. The method of claim 22, between steps e) and f) further including the step:
   i) calculating a first average line width $<w_j>$ for each strip of test pattern lines from the measured line widths for all the printed test pattern lines in the strip;
   j) calculating a second average line width $<w>$ from the first average line widths $<w_j>$ for each strip of the test pattern;
   k) calculating the difference between the second average line width (w) and the first average line width ($w_j$) for each strip of the test pattern;
   l) if the absolute value of the difference exceeds a second predetermined threshold, normalizing the measured line width for each test pattern line (i) in each strip (j) where the absolute value of the difference exceeds the second predetermined threshold using the following equation: $w^0_{ij} = w^m_{ij} - <w_j> + <w>$, wherein $w^m_{ij}$ is the measured line width of line i in strip j and $w^0_{ij}$ is the normalized measured line width of line i in strip j; and
   m) in step f), for each normalized measured line width, calculating the difference between the normalized measured line width and the target value.

25. The method of claim 22, further including the steps:
   i) in step g), if the absolute value of the difference exceeds the first predetermined threshold, adjusting the current supplied to the individual LED associated with the test pattern line by a fraction of the difference to partially reduce the difference; and
   j) iteratively performing steps a) through i) until the absolute value of the difference between the measured line width and the target value in step f) is less than or equal to the first predetermined threshold.

26. A method of adjusting print uniformity for a xerographic device having an LED printbar, the method comprising the following steps:
   a) printing a first test pattern line, a second test pattern line, and a third test pattern line on a target media, wherein each test pattern line is in the process direction of the xerographic device, wherein the first test pattern line is associated with a first LED of the LED printbar and an adjacent second LED, wherein the second test pattern line is associated with the second LED and an adjacent third LED, wherein the third test pattern line is associated with the first, second, and third LEDs, and wherein each test pattern line is spaced from adjacent test pattern lines;
   b) transferring the target media with the printed first, second, and third test pattern lines to a scanner;
   c) scanning the target media and detecting the printed first, second, and third test pattern lines;
   d) communicating detected first test pattern line information, detected second test pattern line information, and detected third test pattern line information to a computer associated with control of current supplied to individual LEDs of the LED printbar,
   e) determining a first measured value for a measured metric from the detected first test pattern line information, a second measured value for the measured metric from the detected second test pattern line information, and a third measured value for the measured metric from the detected third test pattern line information;
   f) calculating the difference between the first measured value and a first target value;
   g) calculating the difference between the second measured value and a second target value;
   h) calculating the difference between the third measured value and a third target value;
   i) performing an algorithm to determine a fourth measured value, a fifth measured value, and a sixth measured value for the measured metric from the first measured value, second measured value, and third measured value, wherein the fourth measured value is associated with the first LED, the fifth measured value is associated with the second LED, and the sixth measured value is associated with the third LED; and
   j) comparing each of the fourth, fifth, and sixth measured values to a fourth target value and, if the absolute value of the difference in one or more of these comparisons exceeds a predetermined threshold, adjusting the current supplied to the one or more LEDs associated with the measured value exceeding the threshold to reduce the difference.

27. The method of claim 26, wherein the measured metric is selected from the group of metrics consisting of a summed line reflectance metric, an integrated line reflectance metric, a minimum line reflectance metric, and a line width metric.

28. The method of claim 26, before step a) further including the step:

k) adjusting the current supplied to each LED of the LED printbar to a midrange value.

29. The method of claim 26, further including the steps:

k) in step j), if the absolute value of the difference in one or more of the comparisons exceeds the predetermined threshold, adjusting the current supplied to the one or more LEDs associated with the measured value exceeding the threshold by a fraction of the difference to partially reduce the difference; and l) iteratively performing steps a) through k) until the absolute value of the difference for each of the comparisons in step j) is less than or equal to the predetermined threshold.

30. The method of claim 26, further including the following step:

k) performing steps a) through j) for each combination of three adjacent LEDs in the LED printbar.

31. The method of claim 30, wherein step a) prints a test pattern including a set of strips of multiple test pattern lines, wherein each strip is in the cross-process direction of the xerographic device, and wherein each strip includes a repetitive sequence of a test pattern line and n blank lines.

32. The method of claim 31, further including the step:

l) performing steps a) through k) for each LED of the LED printbar two or more times.

33. The method of claim 31, wherein the measured metric is a line width metric.

34. The method of claim 33, further including the steps:

l) between steps g) and i), calculating a first average line width for the printed test pattern lines associated with two adjacent LEDs of the LED printbar from the first measured line width values and the second measured line width values and using the result as the first target value and the second target value; and m) between steps h) and i), calculating a second average line width for the printed test pattern lines associated with three adjacent LEDs of the LED printbar from the third measured line width values and using the result as the third target value.

35. The method of claim 33, further including the steps:

l) in step j), if the absolute value of the difference in one or more of the comparisons exceeds the predetermined threshold, adjusting the current supplied to the one or more LEDs associated with the measured value exceeding the threshold by a fraction of the difference to partially reduce the difference; and m) iteratively performing steps a) through k) until the absolute value of the difference for each of the comparisons in step j) is less than or equal to the predetermined threshold.

36. The method of claim 26, wherein the test pattern line printed in step a) is a dotted line.

37. The method of claim 36, before step a) further including the step:

k) adjusting the current supplied to each LED of the LED printbar to a midrange value.

38. The method of claim 36, further including the steps:

k) in step j), if the absolute value of the difference in one or more of the comparisons exceeds the predetermined threshold, adjusting the current supplied to the one or more LEDs associated with the measured value exceeding the threshold by a fraction of the difference to partially reduce the difference; and l) iteratively performing steps a) through k) until the absolute value of the difference for each of the comparisons in step j) is less than or equal to the predetermined threshold.

39. The method of claim 36, further including the step:

k) performing steps a) through j) for each combination of three adjacent LEDs in the LED printbar.

40. The method of claim 39, wherein step a) prints a test pattern including a set of strips of multiple test pattern lines, wherein each strip is in the cross-process direction of the xerographic device, and wherein each strip includes a repetitive sequence of a test pattern line and n blank lines.

41. The method of claim 40, further including the step:

l) performing steps a) through k) for each LED of the LED printbar two or more times.

42. The method of claim 40, wherein the measured metric is a line width metric.

43. The method of claim 42, further including the steps:

l) between steps g) and i), calculating a first average line width for the printed test pattern lines associated with two adjacent LEDs of the LED printbar from the first measured line width values and the second measured line width values and using the result as the first target value and the second target value; and m) between steps h) and i), calculating a second average line width for the printed test pattern lines associated with three adjacent LEDs of the LED printbar from the third measured line width values and using the result as the third target value.

44. The method of claim 42, further including the steps:

l) in step j), if the absolute value of the difference in one or more of the comparisons exceeds the predetermined threshold, adjusting the current supplied to the one or more LEDs associated with the measured value exceeding the threshold by a fraction of the difference to partially reduce the difference; and m) iteratively performing steps a) through k) until the absolute value of the difference for each of the comparisons in step j) is less than or equal to the predetermined threshold.

45. A xerographic device comprising:

an LED printbar including a plurality of individual LEDs, wherein the LED printbar is associated with printing a test pattern on a target media to determine print uniformity for the xerographic device;

a computer in communication with the LED printbar for controlling input currents to individual LEDs of the LED printbar; and a scanner device in communication with the computer for scanning the target media, detecting the printed test pattern on the target media, and communicating detected test pattern information to the computer;

wherein the computer determines a measurements for lines associated with the test pattern, calculates the difference between the measurements and target values, and if the absolute value of the difference exceeds a predetermined threshold, adjusts the input current to the individual LED associated with the measurement by a fraction of the difference to partially reduce the difference.

46. The xerographic device of claim 45, wherein the scanner device is a flatbed scanner.

* * * * *